Aug. 25, 1953     O. W. SWANSON     2,649,616
POULTRY SHACKLE
Filed Dec. 3, 1951
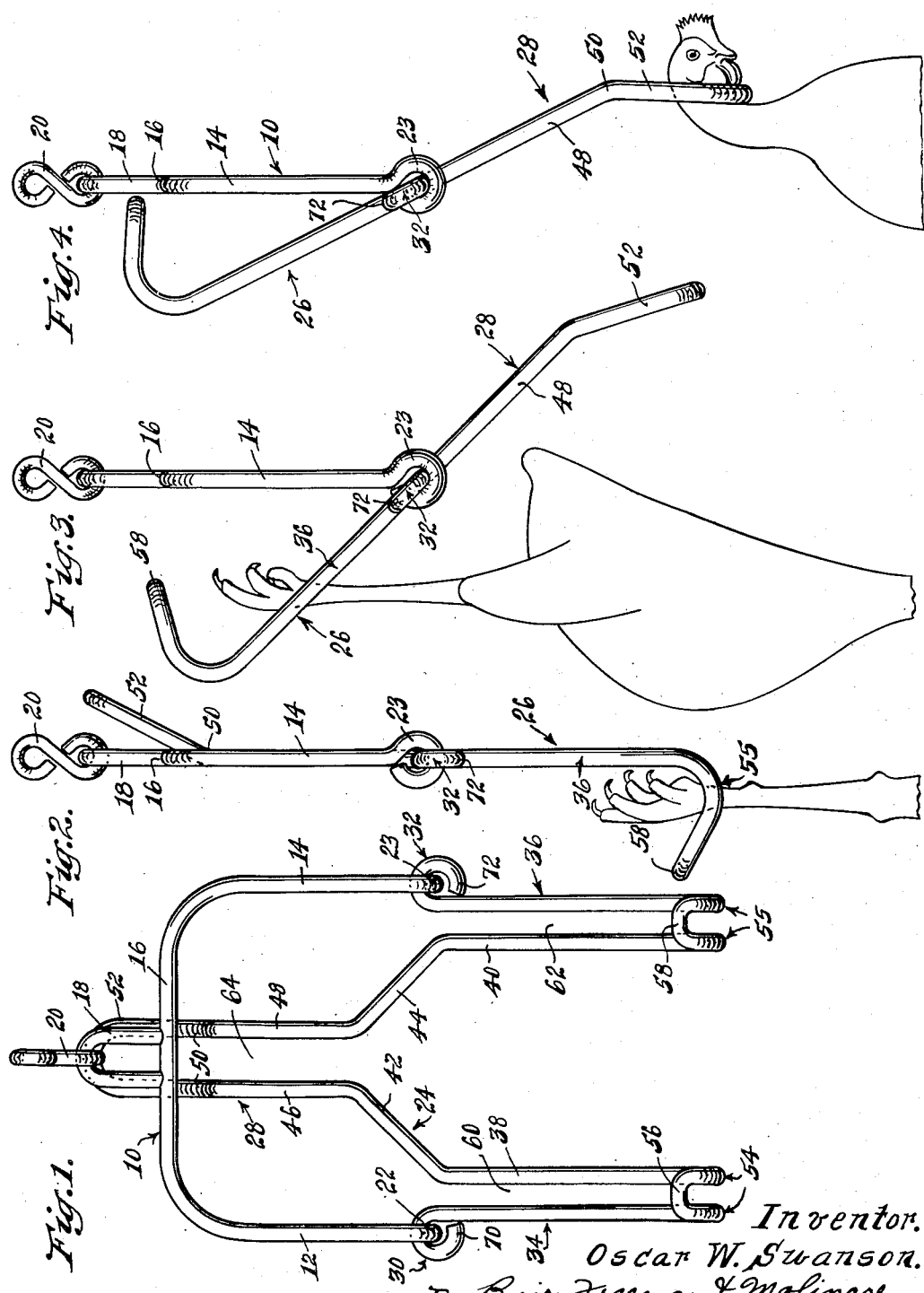
Inventor.
Oscar W. Swanson.
By Bair, Freeman & Molinare
Att'ys.

Patented Aug. 25, 1953

2,649,616

UNITED STATES PATENT OFFICE 2,649,616

POULTRY SHACKLE

Oscar W. Swanson, Ottumwa, Iowa, assignor to Barker Poultry Equipment Company, Ottumwa, Iowa, a corporation of Iowa Application December 3, 1951, Serial No. 259,539

14 Claims. (Cl. 17—44.1)

This invention relates to a poultry shackle, and more particularly to a shackle pivotable about a horizontal axis for the purpose of discharging the fowl suspended therefrom, said shackle being particularly desirable for large fowl such as turkeys.

The removal of feathers from poultry is, today, done on a mass production basis. The fowl are suspended from a conveyor chain and are taken down a conveyor line along which stations are set up for certain dressing operations to be performed upon the fowl. The conveyor chain is usually provided with a plurality of spaced shackles from which the fowl are suspended. The conventional shackle provides means for inserting the legs of the fowl so that the fowl may be suspended therefrom and sometimes includes an attachment by which the fowl may be suspended from its neck or head.

After the fowl has passed down the conveyor line, in removing the fowl from the shackle it is necessary to grasp the shackle with one hand and then individually release each of the legs from the poultry shackle. The releasing of the legs from the poultry shackle generally comprises moving the leg upwardly with respect to the shackle, and therefore the necessity of grasping the shackle with one hand to hold down the shackle can be readily seen.

Some of the larger chickens and most of the turkeys are rather heavy, some turkeys weighing nearly 40 lbs. It can be seen that to hold down the shackle with one hand and to pull upwardly on the legs of the large bird to release the bird from the shackle, requires considerable effort. After one leg has been released, the entire weight of the bird must be raised by the operator when releasing the second leg and it can be seen that with very heavy birds this becomes a very arduous task, particularly on an assembly line basis when one bird after another is being removed from the assembly line.

Thus, one of the objects of this invention is to provide a wire shackle for fowl which eliminates the necessity of grasping the fowl and lifting the fowl from the shackle.

Another object of this invention is to provide a wire shackle which is pivotable about a horizontal axis and which in one attitude is adapted to have fowl suspended by their legs therefrom, and in another attitude is adapted to have a fowl suspended by the head therefrom.

A further object of this invention is to provide a shackle for fowl which is manually pivotable to a position where the weight of the fowl causes the fowl to become disengaged from the shackle and fall free therefrom.

Still another object of this invention is to provide a wire shackle which may be unloaded manually by an operator employing but one hand to cause unloading of the shackle.

Still a further object of this invention is to provide a wire shackle which eliminates any extra wires or structure for the suspension of the fowl by the head or neck.

And still another object of this invention is to provide a shackle for fowl, which is formed of only two bent wires.

And still a further object of this invention is to provide a wire shackle which, by reason of its increased resiliency, is adapted to accommodate a greater range of sizes of legs and necks of fowl than wire shackles have heretofore accommodated.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a front elevation view of my poultry shackle;

Figure 2 is a side elevation view of my poultry shackle and is taken looking from the right of Figure 1;

Figure 3 is a side view similar to Figure 2 showing the shackle in an intermediate pivoted position for discharging the fowl from the shackle; and Figure 4 is a side elevation view similar to Figure 3 showing the shackle in the fully pivoted position with a fowl suspended by the head therefrom.

Referring now to Figure 1 there is shown a U-shaped support member, generally indicated at 10, having legs 12 and 14 extending downwardly from a cross member 16. A U-shaped loop 18 is secured by appropriate means, such as by welding, to cross member 16 and extends upwardly therefrom. A link 20 is interlinked to loop 18 and is part of the structure by which the poultry shackle is suspended from the conveyor (not shown). The lower ends of legs 12 and 14 are bent to form rings or loops 22 and 23.

The holding member of the shackle is generally indicated by numeral 24, and includes the lower leg holding portion 26 and the upper handle portion 28. The holding member 24 is formed of a single wire member which is bent to form both the leg holding portion 26 and the handle portion 28. The ends of the wire forming the holding member 24 are bent to form rings or loops 30 and 32 which are respectively interlinked with rings or loops 22 and 23.

The wire holding member 24 is bent to form leg holding hairpin portions or members 34 and 36, of which the respective inner legs are 38 and 40. These inner legs 38 and 40 extend upwardly, substantially to the point of pivotal connection of the holding member 24 to the support member 10, and are then bent toward each other as in portions 42 and 44 and thereafter extend parallel as 46 and 48 to form the hairpin type handle indicated at 28.

The handle 28 is bent at 50 so that the upper end 52 of handle 28 is bent out of the plane of the remainder of the handle 28.

The lower ends of the leg holding hairpin portions 34 and 36 are bent at 54 and 55 respectively to form laterally extending portions of the leg holding members 34 and 36. The extended ends 56 and 58 of the leg holding members are bent upwardly to form upwardly opening hooks which are best seen in side elevation in Figure 2.

The hairpin shaped elements 34 and 36 form slots 60 and 62 which extend along the entire length of the hairpin shaped elements. The hairpin shaped handle 28 bounds a slot 64. The upper ends of slots 60 and 62 are open; and the lower end of slot 64 is open. When the holding member is pivoted from the position in Figure 2 to the position in Figure 3 the weight of the bird causes the legs to slide along the slots 60 and 62 until they reach the open ends of the slots, at which time the fowl is discharged from the shackle. When a fowl is held by the head as shown in Figure 4 and the shackle is pivoted towards the position shown in Figure 2, the neck of the bird slides along the slot 64 until it reaches the open end thereof, at which time the fowl is discharged from the shackle.

The rings or loops 30 and 32 respectively include portions 70 and 72 which are adapted to engage portions of the legs 12 and 14 of the support member 10 to limit the pivoting of the shackle, as shown clearly in Figure 4. Similarly, the upper portion 52 of the handle 28 is adapted to engage the cross member 16 to limit the pivoting of the holding member 24 in the opposite direction.

When the holding member 24 is pivoted to the position shown in Figure 4, the upper displaced portion 52 of handle 28 is substantially vertical as shown in Figure 4, which is desirable for the suspension of fowl therefrom.

In wire type shackles, the wires which bound the leg holding slots have a certain amount of resiliency and therefore are adapted to accommodate a limited range of leg and neck sizes of a fowl. In previous wire type shackles the range of sizes which may be accommodated by a shackle is limited because the vertical members which bound the leg and neck slots are usually welded at their upper and lower ends to upper and lower cross members. Since the resiliency or bending of a wire is a function of the length of the wire between points where it is fixed, the amount of resiliency is naturally limited in previous wire type shackles.

In this wire shackle, the range of sizes of legs and necks of fowl which may be accommodated by the leg holding means and head holding means is greatly increased. This is primarily due to the fact that the wire holding member 24 is not fixed or supported at any point between the rings 30 and 32 and therefore the portion of the wire member 24 which is not supported between successive points of support is very much greater. Consequently, greater resiliency is provided between the members bounding the leg and neck slots and therefore a greater range of sizes of legs and necks may be accommodated by this shackle.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A shackle for fowl comprising a support member having a pair of spaced downwardly depending legs, a holding member pivotly connected to the lower ends of said downwardly depending legs and positioned substantially between said legs of the support member, said holding member having a leg holding portion extending below said pivotal connection and a second portion extending above said pivotal connection, said leg holding portion having formed therein laterally spaced slots adapted to receive the legs of a fowl and engage the feet thereof, said slots being open across the upper end thereof, said second portion being attached to said first portion between said laterally spaced slots, said second portion adapted to be grasped to pivot the holding member to an up-ended position, wherein the leg holding slots are open across the lower end thereof.

2. A shackle for fowl comprising a support member having a pair of spaced downwardly depending legs, a holding member pivotly connected to the lower ends of said downwardly depending legs and positioned substantially between said legs of the support member, said holding member having a leg holding portion extending below said pivotal connection and a second portion extending above said pivotal connection, said leg holding portion having formed therein laterally spaced slots adapted to receive the legs of a fowl and engage the feet thereof, said slots being open across the upper end thereof, said second portion being attached to said first portion between said laterally spaced slots, said second portion adapted to be grasped to pivot the holding member to an up-ended position, wherein the leg holding slots are open across the lower end thereof, and means on said support member and on said holding member for limiting the pivoting between said holding member and said support member.

3. A shackle for fowl comprising a support member having a pair of spaced downwardly depending legs, a holding member pivotly connected to the lower ends of said downwardly depending legs and positioned substantially between said legs of the support member, said holding member defining a pair of laterally spaced holding members extending below said pivotal connection and a handle portion extending above said pivotal connection, said leg holding members having formed therein slots adapted to receive the legs of a fowl, said slots being open across the upper end thereof, and said handle portion being secured to said leg holding members therebetween, said handle portion adapted to be grasped to pivot the holding member to an up-ended position, wherein the leg holding slots are open across the lower end thereof.

4. A shackle for fowl comprising a support member having a pair of spaced downwardly depending legs, a holding member pivotly connected to the lower ends of said downwardly depending legs, and having a leg holding portion extending below said pivotal connection and a handle portion extending above said pivotal connection, said leg holding portion having formed therein slots adapted to receive the legs of a fowl and engage the feet thereof, said slots being open across the upper end thereof, said handle portion adapted to be grasped to pivot the holding member to an up-ended position, wherein the leg holding slots are open across the lower end thereof, said leg slots being laterally spaced, and said handle being positioned substantially symmetrically between the leg slots, the width of the handle being less than the spacing between the closest edges of the spaced leg slots.

5. A shackle for fowl comprising a support member having a pair of spaced downwardly depending legs, a holding member pivotly connected to the lower ends of said downwardly depending legs, and having a leg holding portion extending below said pivotal connection and a handle portion extending above said pivotal connection, said leg holding portion having formed therein slots adapted to receive the legs of a fowl and engage the feet thereof, said slots being open across the upper end thereof, said handle portion adapted to be grasped to pivot the holding member to an up-ended position, wherein the leg holding slots are open across the lower end thereof, said leg slots being laterally spaced, and said handle being positioned substantially symmetrically between the leg slots, the width of the handle being less than the spacing between the closest edges of the spaced leg slots, and said holding member including an intermediate portion between the handle and the leg holding portion, the edges of said intermediate portion diverging from the edges of the handle to the closest edges of the spaced leg slots.

6. A shackle for fowl comprising a support member having a pair of spaced downwardly depending legs, a holding member pivotly connected to the lower ends of said downwardly depending legs, and having a leg holding portion extending below said pivotal connection and a second portion extending above said pivotal connection, said leg holding portion having formed therein slots adapted to receive the legs of a fowl and engage the feet thereof, said slots being open across the upper end thereof, said second portion adapted to be grasped to pivot the holding member to an up-ended position, wherein the leg holding slots are open across the lower end thereof, the leg holding portion of the holding member having laterally extending portions at the lower end thereof, and said leg holding slots continuing into said laterally extending portions and being closed across the ends thereof.

7. A shackle for fowl comprising a support member having a pair of spaced downwardly depending legs, a holding member pivotly connected to the lower ends of said downwardly depending legs, and having a leg holding portion extending below said pivotal connection and a second portion extending above said pivotal connection, said leg holding portion having formed therein slots adapted to receive the legs of a fowl and engage the feet thereof, said slots being open across the upper end thereof, said second portion adapted to be grasped to pivot the holding member to an up-ended position, wherein the leg holding slots are open across the lower end thereof, the leg holding portion of the holding member having laterally extending portions at the lower end thereof, said leg holding slots continuing into said laterally extending portions and being closed across the ends thereof, and the extended ends of said laterally extending portions curving upwardly to form upwardly opening hooks.

8. A shackle for fowl comprising a support member having a pair of spaced downwardly depending legs, a holding member pivotly connected to the lower ends of said downwardly depending legs, and having a leg holding portion extending below said pivotal connection and a handle portion extending above said pivotal connection, said leg holding portion having formed therein slots adapted to receive the legs of a fowl and engage the feet thereof, said slots being open across the upper end thereof, said handle portion adapted to be grasped to pivot the holding member to an up-ended position, wherein the leg holding slots are open across the lower end thereof, said handle having elements cooperating with the support member for limiting pivoting of the holding member in one direction, and portions of the pivotal connection between the holding member and the support member cooperating to limit the pivoting of the holding member in the opposite direction.

9. A shackle for fowl comprising a support member having a pair of spaced downwardly depending legs, a holding member pivotly connected to the lower ends of said downwardly depending legs, and formed to define a leg holding portion extending below said pivotal connection and a handle portion extending above said pivotal connection, said wire leg holding portion defining slots adapted to receive the legs of a fowl and engage the feet thereof, said slots being open across the upper end thereof, said handle portion adapted to be grasped to pivot the holding member to an up-ended position, wherein the leg holding slots are open across the lower end thereof, said wire handle defining a slot opening at one end thereof in a direction opposite to the open ends of the leg slots, and said handle being adapted, when the holding member is in said up-ended position, to receive the neck of a fowl and engage the head thereof.

10. A shackle for fowl comprising a support member having a pair of spaced downwardly depending legs, a wire holding member pivotly connected to the lower ends of said downwardly depending legs, and formed to define a leg holding portion extending below said pivotal connection and a handle portion extending above said pivotal connection, said wire leg holding portion having formed therein slots adapted to receive the legs of a fowl and engage the feet thereof, said slots being open across the upper end thereof, said handle portion adapted to be grasped to pivot the holding member to an up-ended position, wherein the leg holding slots are open across the lower end thereof, said wire handle defining a slot opening at one end thereof in a direction opposite to the open ends of the leg slots, the upper end of the handle being offset, said handle being adapted, when the holding member is in said up-ended position, to receive the neck of a fowl and engage the head thereof, and the offset portion of said handle adapted to be substantially vertical when a fowl is supported from said handle.

11. A fowl shackle comprising a U-shaped wire support member having downwardly depending legs, the lower end of each leg having a ring formed therein, a wire holding member adapted to be pivoted with respect to said support, the ends of said wire holding member having rings formed therein which are interlinked to the rings on said support member, the rings on said holding member being positioned substantially at right angles to the rings in said support member, whereby limited pivoting between the support member and the holding member is obtained, said wire holding member forming a pair of leg holding hairpin-shaped elements adapted to extend below said support member rings, the adjacent legs of said pair of hairpin-shaped elements continuing beyond said support member rings, in the direction opposite to the direction that the leg holding hairpin elements extend from said support rings, and joining each other to form a hairpin-shaped handle.

12. A fowl shackle comprising a U-shaped wire support member having downwardly depending legs, the lower end of each leg having a ring formed therein, a wire holding member adapted to be pivoted with respect to said support, the ends of said wire holding member having rings formed therein which are interlinked to the rings on said support member, the rings on said holding member being positioned substantially at right angles to the rings in said support member, whereby limited pivoting between the support member and the holding member is obtained, said wire holding member forming a pair of leg holding hairpin-shaped elements adapted to extend below said support member rings, the adjacent legs of said pair of hairpin-shaped elements continuing beyond said support member rings, in the direction opposite to the direction that the leg holding hairpin elements extend from said support rings, the portion of said adjacent legs continuing beyond the support rings first tapering toward each other and then extending parallel to form a hairpin-shaped handle.

13. A fowl shackle comprising a U-shaped wire support member having downwardly depending legs, the lower end of each leg having a ring formed therein, a wire holding member adapted to be pivoted with respect to said support, the ends of said wire holding member having rings formed therein which are interlinked to the rings on said support member, the rings on said holding member being positioned substantially at right angles to the rings in said support member, whereby limited pivoting between the support member and the holding member is obtained, said wire holding member forming a pair of leg holding hairpin-shaped elements adapted to extend below said support member rings, the adjacent legs of said pair of hairpin-shaped elements continuing beyond said support member rings, in the direction opposite to the direction that the leg holding hairpin elements extend from said support rings, and joining each other to form a hairpin-shaped handle, and the lower ends of said hairpin-shaped leg holding elements forming upwardly opening hooks.

14. A fowl shackle comprising a U-shaped wire support member having downwardly depending legs, the lower end of each leg having a ring formed therein, a wire holding member adapted to be pivoted with respect to said support, the ends of said wire holding member having rings formed therein which are interlinked to the rings on said support member, the rings on said holding member being positioned substantially at right angles to the rings in said support member, whereby limited pivoting between the support member and the holding member is obtained, said wire holding member forming a pair of leg holding hairpin-shaped elements adapted to extend below said support member rings, the adjacent legs of said pair of hairpin-shaped elements continuing beyond said support member rings, in the direction opposite to the direction that the leg holding hairpin elements extend from said support rings, and tapering toward each other and then forming a hairpin-shaped handle, and the upper end of said hairpin-shaped handle extending away from the plane of the remainder of the handle.

OSCAR W. SWANSON.

References Cited in the file of this patent

UNITED STATES PATENTS

| Number | Name | Date |
|---|---|---|
| 461,256 | Brinkerhoff | Oct. 13, 1891 |
| 583,100 | Tucker | May 25, 1897 |
| 908,392 | Casteel | Dec. 29, 1908 |
| 938,765 | Henig | Nov. 2, 1909 |